Patented June 24, 1930

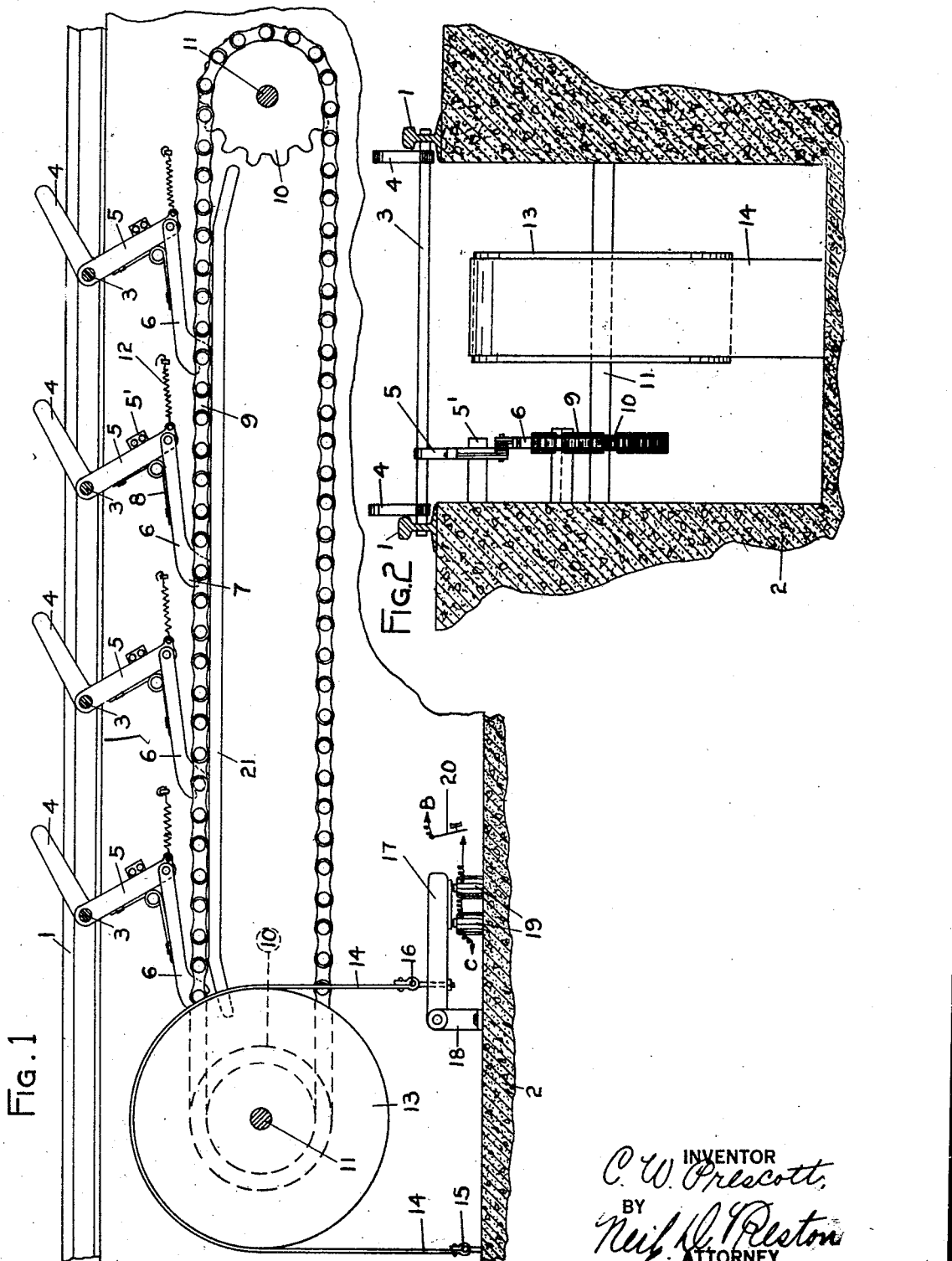

1,766,537

UNITED STATES PATENT OFFICE

CHARLES W. PRESCOTT, OF MILL HILL, ENGLAND, ASSIGNOR TO GENERAL RAILWAY SIGNAL COMPANY, OF ROCHESTER, NEW YORK

CAR RETARDER FOR CLASSIFICATION YARDS

Application filed September 28, 1927. Serial No. 222,616.

This invention relates in general to braking means for railway vehicles, and has more particular reference to a track brake for such vehicles.

In the braking of railway vehicles, and more particular in connection with classification yard operation it is often desirable to effect necessary braking by means positioned along the trackway rather than by the usual brake shoes carried by the railway vehicles themselves. It is also desirable at times to dissipate the energy of a moving vehicle, while braking the same, by means other than brake shoes applied to the vehicle wheels.

With the above and other considerations in mind, it is proposed, in accordance with the present invention, to provide braking means positioned adjacent the trackway, together with means for receiving the energy of moving vehicles and transmitting such energy to the said braking means, to there be dissipated in the form of heat or be converted into useful energy as desired.

Further objects, purposes, and characteristic features of the present invention will appear as the description progresses, reference being had to the accompanying drawing showing, solely by way of illustration, one physical form which the invention may assume. In the drawing:—

Fig. 1 is a longitudinal sectional view; and

Fig. 2 is a transverse sectional view, of a device constructed in accordance with the present invention.

Referring to the drawing, track rails 1 are shown, forming a usual trackway, beneath which is a receiving pit 2 lined with concrete in the particular form shown. Pivoted between the track rails, is a plurality of shafts 3, each of which carries treadles 4 rigidly fixed thereto. The treadles 4 are inclined, as shown in Fig. 1, in the normal direction of travel and are placed directly in the path of travel of the vehicle wheels.

On each shaft 3 is fixed an arm 5 to which is pivoted a drive arm 6 having a toothed end 7 forced into engagement, by means of a spring 8, with a drive chain 9 passing around sprocket wheels 10. A stop arm 5¹ limits the motion of the arm 5 in one direction. The sprocket wheels 10 are carried by shafts 11 supported in the side walls of the pit 2. Each drive arm 6 is furnished with a return spring 12 for bringing it back to its normal position as shown in Fig. 1, when the treadle member 4 is freed from the wheels to allow it to assume its normal position. The upper stretch of the chain 9 is supported by an elongated plate 21 for facilitating the proper interengagement between the arms 6 and chain 9.

Securely fastened to the left hand sprocket wheel 10, (Fig. 1) is a brake drum 13, over which passes a brake band 14 fixed at one end 15 to the floor of the pit 2, and at the other end 16, to a pivoted armature 17, supported by an arm 18 and operable downwardly to tension the brake band about the brake drum by means of electro magnets 19, energized through a circuit including a source of energy C—B and a control switch 20. This control switch 20 is shown as manually operable, but it can be automatically operated in accordance with traffic conditions, speed of the vehicle to be braked, etc. While the brake means shown and described is constituted by a brake drum and brake band, it is obvious that this could be replaced by an electric-dynamo, for example so that energy received from the treadles 4 could be put to some useful purpose, instead of being dissipated in the form of heat.

From the above description the operation of this brake device can be readily understood. In brief, on passage of a vehicle over the tracks in a direction from left to right as viewed in Fig. 1, the vehicle wheels successively pass over and depress the treadles 4 and upon each depression of any one of the treadles, the brake drum 13 is ratcheted around in a counter-clockwise direction. If no braking effect be desired, the brake band is left in the condition shown in Fig. 1, namely with the magnets 19 de-energized and the armature 17 in its upper position. If, however, it be desired to brake the railway vehicle, the switch 20 is closed, manually or in some automatic manner, as referred to above, whereupon the armature 17 is attracted, and the brake band 14 is drawn into close frictional engagement with the brake drum. The springs 8 operate to constantly force the drive arms 6 into engagement with the drive chain 9, while springs 12, as soon as pressure on the treadles 4 is removed, draw the arms 8 to the right against their stops 5¹, and thus position the drive arms 6 for a new ratcheting operation.

The above rather specific description of one form of applicant's invention has been given solely by way of illustration, and it is not intended, in any manner whatsoever, in a limiting sense. Obviously, this invention can assume various physical forms, and is susceptible of numerous modifications, and all such forms and modifications are intended to be included by this invention, as come within the scope of the appended claims.

Having described my invention, I now claim:—

1. In a track brake for railway vehicles, an arm pivoted on a fixed pivot in the path of a vehicle wheel, a brake, means for putting the brake in active or passive condition, a drive chain for the brake, and ratchet means for driving the chain and forming a drive connection between the fixed arm and the movable chain.

2. In a track brake for railway vehicles, an arm pivoted in the path of a vehicle wheel, a brake, electrically controlled means for putting the brake in active or passive condition, a movable drive chain for the brake, and ratchet means, including a fixed pivoted toothed arm, forming a drive connection between the arm and the chain.

3. In a track brake, in combination with track rails, a plurality of shafts pivoted between the rails, treadles fixed to each shaft adjacent the rails, a pivoted drive arm fixed to each shaft, a brake, a drive chain for the brake, and means forcing the pivoted arms into driving engagement with the chain, whereby passage of vehicle wheels over the treadles depresses the same and transmits energy to the brake.

4. In a track brake, in combination with track rails, a plurality of shafts pivoted between the rails, treadles fixed to each shaft adjacent the rails, a pivoted drive arm fixed to each shaft, a brake, a drive chain for the brake, means forcing the pivoted arms into driving engagement with the chain, means for restoring the said arms to initial position, and stop means for the said arms, whereby passage of vehicle wheels over the treadles transmits energy to the brake.

5. In a rail brake for railway vehicles, a brake drum, a brake band on the drum, means for tensioning the band, a drive chain for the drum, a pivoted toothed arm for ratchet driving the chain, a pivoted shaft carrying the toothed arm, and treadle means fixed to the shaft and projecting above, and adjacent to, the track rails.

In testimony whereof I affix my signature.

CHARLES W. PRESCOTT.